Patented Dec. 15, 1936

2,064,395

UNITED STATES PATENT OFFICE 2,064,395

ORGANIC DISULPHIDES

Eduard Tschunkur and Hugo Köhler, Cologne-Mulheim, Germany, assignors to I. G. Farbenindustrie Aktiengesellschaft, Frankfort-on-the-Main, Germany No Drawing. Application March 8, 1934, Serial No. 714,631. In Germany March 21, 1933

9 Claims. (Cl. 260—16)

The present invention relates to the preparation of organic disulphides.

We have found that organic compounds which contain sulphydryl groups can be converted into the corresponding disulphides by subjecting the same to the action of a compound selected from the group comprising chloric acid and salts thereof, in particular water soluble salts, such as alkali metal chlorate. The reaction is performed in an aqueous medium, if desired, in the presence of acids, such as hydrochloric acid, sulphuric acid, nitric acid, phosphoric acid, formic acid or oxalic acid etc. The reaction takes place at ordinary temperature and can be accelerated by the application of higher temperatures.

Another feature of our invention consists in the addition of catalysts, such as osmium tetroxide or of such substances as are capable of reducing chloric acid to a lower stage of oxidation. As substances of the latter class there may be mentioned for instance nitrous acid or sulphurous acid, ferrous salts, manganous salts, cuprous salts, titanyl salts and the like. The addition of these substances has the effect that the oxidation can be performed at lower temperature or with lower concentrations of acid or that the time of the reaction can be shortened.

Depending on the nature of the sulphydryl compound the process can be effected in an aqueous medium, if desired, with the addition of an indifferent organic solvent such as benzene, benzine and the like.

The following examples illustrate the invention without limiting it thereto:

Example 1

100 kgs. of ethylmercaptan are stirred with 1000 liters of a 10% aqueous hydrochloric acid and 32 kgs. of sodium chlorate dissolved in water are added thereto at a temperature of about 25–30° C. The diethyldisulphide of the formula $C_2H_5SSC_2H_5$, thus formed, represents a dark-yellow malodorous oil of the boiling point 150–153° C.

Example 2

100 kgs. of benzylmercaptan are stirred with 1000 liters of a 10% aqueous hydrochloric acid and 200 liters of benzene at 25° C. and 20 kgs. of sodium chlorate dissolved in water are added thereto. As soon as the melting point of a test portion has reached 70–72° C., the layer of benzene is separated and the dibenzyldisulphide is isolated therefrom by distilling off the benzene. The dibenzyldisulphide of the formula $$C_6H_5CH_2SSCH_2C_6H_5$$

is obtained in a pure state and in a nearly quantitative yield.

Example 3

100 kgs. of para-thiocresol are stirred with 1000 liters of a 10% aqueous hydrochloric acid and 200 liters of benzene at a temperature of 30° C. and an aqueous solution of 20 kgs. of sodium chlorate is added thereto. As soon as a test portion no longer contains compounds which are soluble in a cold diluted solution of caustic soda, the layer of benzene is separated and the dicresyldisulphide of the formula $CH_3C_6H_4SSC_6H_4CH_3$ is obtained therefrom in a pure state and in a nearly quantitative yield.

Example 4

100 kgs. of thio-salicylic acid are suspended in 1000 liters of a 5% aqueous hydrochloric acid. A solution of 16 kgs. of sodium chlorate in water is added thereto, and stirring is continued at a temperature of about 40° C. until a test portion shows a melting point of 280–285° C. The dithiosalicylic acid of the formula

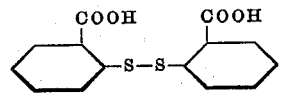

can be filtered off and washed out and is obtained in a pure state and in a nearly quantitative yield.

Example 5

20 kgs. of thio-salicylic acid are dissolved in 200 liters of water with the addition of 17 kgs. of a caustic soda solution of 30% strength. A solution of 3.5 kgs. of sodium chlorate and of 1.7 kgs. of sodium nitrite is added thereto and the slightly alkaline reacting solution is stirred at about 60° C. until a test portion precipitated by means of mineral acid shows a melting point of 280–285° C. After cooling the free dithio-salicylic acid is precipitated by the addition of mineral acid and filtered off. The yield is nearly quantitative.

Example 6

100 kgs. of mercaptobenzothiazole are suspended in 800 liters of water and 15 kgs. of sodium chlorate and 0.2 kg. of osmium tetroxide are added thereto, whereupon the mixture is boiled under reflux for about 30 hours. The dibenzothiazyldisulphide of the formula

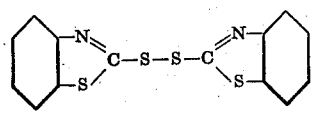

is filtered off and obtained in a nearly quantitative yield.

Example 7

100 kgs. of mercaptobenzothiazole are stirred with 1000 liters of a sulphuric acid of 25% strength or with an equivalent amount of a nitric acid of 25% strength and with a solution of 15 kgs. of sodium chlorate in water. Stirring is continued for about 30 hours, the temperature being 25° C. The dibenzothiazyldisulphide is obtained in a nearly quantitative yield.

If the reaction is performed in the presence of sodium nitrite an acid of much lower concentration can be employed (see Example 9).

Example 8

50 kgs. of mercaptobenzothiazole are stirred with 650 liters of aqueous hydrochloric acid of 2.5% strength and with 8 kgs. of sodium chlorate at a temperature of 80° C. The oxidation is complete after about 4 hours and the dibenzothiazyldisulphide is obtained in a nearly quantitative yield.

By working with one of the above mentioned auxiliary products, the reaction can be performed at a lower temperature while obtaining the same yield.

Example 9

To 1000 liters of aqueous hydrochloric acid of 3% strength are added 100 kgs. of mercaptobenzothiazole and 15 kgs. of sodium chlorate. 7.5 kgs. of sodium nitrite dissolved in water are added thereto drop by drop by means of an inlet tube immersing into the reaction liquid, the temperature being 30–40° C. The oxidation is complete after a few hours and the dibenzothiazoldisulphide is obtained in a nearly quantitative yield.

Example 10

100 kgs. of mercaptobenzothiazole are stirred with a solution in 900 liters of water of 100 kgs. of crystallized oxalic acid, whereupon an aqueous solution of 16 kgs. of sodium chlorate is added at a temperature of 35° C. The reaction is complete after about 8 hours if 7.5 kgs. of sodium nitrite are gradually added to the solution, whereas only part of the mercaptobenzothiazole will be oxidized in the course of the same time if no sodium nitrite is present.

Example 11

100 kgs. of mercaptobenzothiazole are stirred with 1000 liters of an aqueous hydrochloric acid of 10% strength and 16 kgs. of sodium chlorate dissolved in water. To this mixture there are added drop by drop 15 kgs. of sodium bisulphite dissolved in water at ordinary temperature. The oxidation is complete after about 5–6 hours and the dibenzothiazyldisulphide is obtained in a practically quantitative yield.

Example 12

50 kgs. of mercaptobenzothiazole are stirred at 35–40° C. with 200 liters of water, whereupon 6.4 kgs. of free chloric acid in the form of a 9% aqueous solution and 50 liters of 30% aqueous hydrochloric acid are added. A solution of 3.75 kgs. of sodium nitrite dissolved in water is added thereto drop by drop, stirring being continued. The dibenzothiazyldisulphide is obtained in a nearly quantitative yield.

Example 13

A solution of 46 kgs. of thioglycolic acid in 150 liters of water, 50 liters of aqueous hydrochloric acid of 30% strength and 115 liters of an aqueous solution of free chloric acid of 9.4% strength are stirred at about 40° C. and an aqueous solution of 3 kgs. of sodium nitrite is added thereto, stirring being continued until a test portion taken out no longer shows a blue coloration upon the addition of a very dilute solution of ferric chloride and of ammonia. After the oxidation is complete 80 kgs. of sodium chloride are added to the mixture and the dithiodiglycolic acid is extracted by means of ether. The yield is nearly quantitative.

Example 14

100 kgs. of mercaptobenzothiazole are stirred with 1000 liters of a 5% aqueous solution of hydrochloric acid and with 15 kgs. of sodium chlorate at about 50° C. 10 kgs. of cuprous chloride are added thereto in the course of an hour. The oxidation is complete after about 4–5 hours, whereas 10–11 hours are required if no cuprous chloride is added to the mixture. On the other hand, if 28 kgs. of cuprous chloride have been present from the very beginning the oxidation is complete after about 15 minutes.

In the above example there can be used instead of cuprous chloride 60 kgs. of ferrous ammonium sulphate or 125 liters of an aqueous solution of titanous chloride of 15% strength to be added to the reaction mixture in the course of several hours.

Example 15

55 kgs. of 5-methyl-2-mercaptobenzothiazole are stirred with 500 liters of a 5% aqueous hydrochloric acid having dissolved therein 7.5 kgs. of sodium chlorate, the temperature being 35–40° C. 38 liters of a 10% aqueous solution of sodium nitrite are added thereto in the course of 2 hours. After about 4 hours there is obtained the dimethylbenzothiazyldisulphide of the formula:

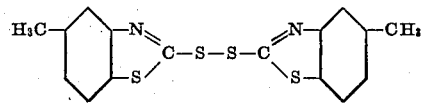

in a nearly quantitative yield.

Example 16

60 kgs. of 6-chloro-2-mercaptobenzothiazole are stirred with 500 liters of a 5% aqueous hydrochloric acid having dissolved therein 7.5 kgs. of sodium chlorate, the temperature being 35–40° C. An aqueous solution of sodium nitrite is added thereto as described in the preceding example. The di-chlorobenzothiazole disulphide is obtained in a nearly quantitative yield.

We claim:

1. The process which comprises subjecting organic compounds which contain sulphydryl groups to the action of a compound selected from the group consisting of chloric acid and salts thereof, while adding thereto a compound which is capable of reducing chloric acid to a lower stage of oxidation.

2. The process which comprises subjecting in an acid medium organic compounds which contain sulphydryl groups to the action of a compound selected from the group consisting of chloric acid and salts thereof, while adding thereto a compound which is capable of reducing chloric acid to a lower stage of oxidation.

3. The process which comprises subjecting mercaptobenzothiazole to the action of a compound selected from the group consisting of chloric acid and salts thereof.

4. The process which comprises subjecting mercaptobenzothiazole to the action of chloric acid in an acid medium.

5. The process which comprises subjecting mercaptobenzothiazole to the action of a compound selected from the group consisting of chloric acid and salts thereof, while adding thereto a compound which is capable of reducing chloric acid to a lower stage of oxidation.

6. The process which comprises subjecting mercaptobenzothiazole to the action of chloric acid in an acid medium, while adding thereto a compound which is capable of reducing chloric acid to a lower stage of oxidation.

7. The process according to claim 6 in which nitrous acid is used as promoter.

8. The process according to claim 6 in which cuprous chloride is used as promoter.

9. The process according to claim 6 in which sulphurous acid is used as promoter.

EDUARD TSCHUNKUR.
HUGO KÖHLER.